United States Patent

Nomura et al.

Patent Number: 5,905,599
Date of Patent: May 18, 1999

[54] OPTICAL LENS HAVING A HYGROSCOPICITY ADJUSTING PART

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/161,742

[22] Filed: Sep. 29, 1998

[30] Foreign Application Priority Data

Oct. 2, 1997  [JP]  Japan .................................. 9-269911

[51] Int. Cl.⁶ ......................................................... G02B 7/02
[52] U.S. Cl. ................................................................ 359/819
[58] Field of Search ..................................... 359/819, 820

[56] References Cited

U.S. PATENT DOCUMENTS 5,576,896  11/1996  Kitaoka et al. ........................ 359/813

FOREIGN PATENT DOCUMENTS 59-154409  9/1994  Japan .

Primary Examiner—Georgia Epps
Assistant Examiner—Ricky Mack
Attorney, Agent, or Firm—Leydig, Voit & Mayer

[57] ABSTRACT

An optical lens made of plastic comprises an optically functioning part, a flange part disposed around the optically functioning part, and a gate-removed part located at an outer circumferential face of the flange part. The gate-removed part is defined by removing a residual gate part projecting from the outer circumferential face. The surface of the gate-removed part is covered with a hygroscopicity adjusting part. The hygroscopicity adjusting part is made of a material less hygroscopic than the plastic of which the optical lens is made.

6 Claims, 3 Drawing Sheets

OPTICAL LENS HAVING A HYGROSCOPICITY ADJUSTING PART

BACKGROUND OF THE INVENTION

1. Field of the Invention

The present invention relates to an optical lens made of plastic, which is used in various kinds of optical instruments.

2. Related Background Art

Optical lenses made of plastic, such as the one shown in FIGS. 4 and 5, have conventionally been known and widely used for eyepieces of 8-mm video cameras, objective lenses of CD-ROM drives, and the like. The optical lens 101 of FIGS. 4 and 5 is made by injection molding, transfer molding, or the like using dies. For making the optical lens 101, a molten resin such as PMMA (polymethyl methacrylate) is caused to flow into a cavity from a gate. Then, the resin is solidified by cooling. After the resin is solidified, the part of resin solidified within the gate orifice, or both the gate and the part of resin solidified within the gate orifice (hereinafter referred to as "residual gate part" collectively) are removed, and surface treatment is carried out as required. Thus, the optical lens 101 is completed.

For processing the above-mentioned residual gate part, it will essentially be ideal if the residual gate part 110 is removed alone from the optical lens 101 by moving a cutting tool such as end mill along the outer circumferential face 104 of the optical lens 101. In general, however, in view of the processing accuracy of the processing machine, reduction in manufacturing cost, and the like, a part of the outer circumferential part (flange part 106) of the optical lens 101 is cut flat as shown in FIG. 4, thereby removing the residual gate part 110. Consequently, the outer circumferential face 104 of the optical lens 101 completed as a product includes a flat, gate-removed part 105 which is defined when the residual gate part 110 is removed.

On the other hand, in general, an optical lens made of plastic absorbs therein moisture (water) existing in the air, due to the hygroscopicity inherent in the plastic material. Also, it is known that the moisture is absorbed into the optical lens 101 radially from the outer circumferential face 104 of the optical lens 101 toward the optical axis (a) thereof.

SUMMARY OF THE INVENTION

It is an object of the present invention to provide an optical lens which can be configured easily and inexpensively, and exhibits stable optical performances with a uniform refractive index.

The optical lens in accordance with the present invention is made of plastic. This optical lens comprises an optically functioning part; a flange part formed around the optically functioning part; a gate-removed part formed at an outer circumferential face of the flange part; and a hygroscopicity adjusting part covering a surface of the gate-removed part. The gate-removed part is defined by removing a residual gate part projecting from the outer circumferential face. The hygroscopicity adjusting part is made of a material less hygroscopic than the plastic forming the optical lens.

In the conventional optical lens 101, as shown in FIG. 4, the residual gate part 110 is cut together with the outer circumferential part (flange part 106) of the optical lens 101, whereby the flat, gate-removed part 105 is formed at the outer circumferential face 104. The gate-removed part 105 is located on the lens optical axis (a) side of the original outer circumferential face 104 of the optical lens 101, which is a cylindrical surface, for example. As a consequence, the outer circumferential face 104 of the optical lens 101 as a whole including the gate-removed part 105 would not be symmetrical about the lens optical axis (a). Namely, within a plane passing through the gate-removed part 105 and including the optical axis (a) of the optical lens 101, as shown in FIG. 5, the distance (r1) from the gate-removed part 105 to the optically functioning part 102 through which light is effectively transmitted becomes shorter than the distance (r2) from the outer circumferential face 104 other than the gate-removed part 105 to the optically functioning part 102.

When the optical lens 101 absorbs moisture in the air in this state, the moisture absorbed into the optical lens 101 from the outer circumferential face 104 other than the gate-removed part 105 would hardly reach the optically functioning part 102. Since the distance from the gate-removed part 105 to the optically functioning part 102 is shorter, by contrast, the moisture absorbed into the lens from the surface of the gate-removed part 105 would permeate into the optically functioning part 102 in a relatively short time (rapidly). Consequently, at the part of optically functioning part 102 near the gate-removed part 105, density would change due to the moisture absorbed into the optical lens 101, thereby increasing the refractive index. As a result, the refractive index in the optically functioning part 102 of the optical lens 101 as a whole may fail to become uniform. When the refractive index of the optically functioning part 102 is thus not uniform, it may affect aberration, thereby failing to yield expected optical performances. In particular, this phenomenon would occur remarkably in PMMA (polymethyl methacrylate) which is widely used as a material for optical lenses. In this case, an optical lens may be formed from a material which hardly absorbs moisture. Since such a material is expensive, however, the optical lens as a product would become expensive as well.

In view of such problems, in the optical lens in accordance with the present invention, the surface of the gate-removed part is covered with a hygroscopicity adjusting part made of a material less hygroscopic than the plastic used as the material forming this optical lens. As a result, the amount of moisture absorbed from the gate-removed part into the optical lens by way of the hygroscopicity adjusting part becomes smaller than the amount of moisture absorbed into the optical lens from the outer circumferential face other than the gate-removed part. Hence, the permeation time (permeation speed) of the moisture absorbed into the optical lens from the outer circumferential face and the gate-removed part can be made substantially the same throughout the outer periphery. Namely, even when the distance from the surface of the gate-removed part to the optically functioning part is set short, the moisture absorbed into the optical lens from the gate-removed part by way of the hygroscopicity adjusting part can be prevented from permeating into the optically functioning part.

As a result, the density in the optically functioning part can be prevented from changing due to the moisture that is absorbed from the gate-removed part into the lens and reaches the optically functioning part. Hence, the optical lens can yield a uniform refractive index.

Preferably, the gate-removed part has a flat surface. In this case, the gate-removed part is formed flat by cutting the residual gate part together with a part of the flange part. Preferably, the gate-removed part has a quadric surface. In this case, the gate-removed part is defined by cutting, like a quadric surface, the residual gate part together with a part of the flange part. Preferably, the plastic used as a material for forming the optical lens is a polymethyl methacrylate (PMMA) resin. Preferably, the hygroscopicity adjusting part is formed from water glass or an UV-curable resin.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, preferred embodiments of the optical lens in accordance with the present invention will be explained in detail with reference to the accompanying drawings.

Figure 1:
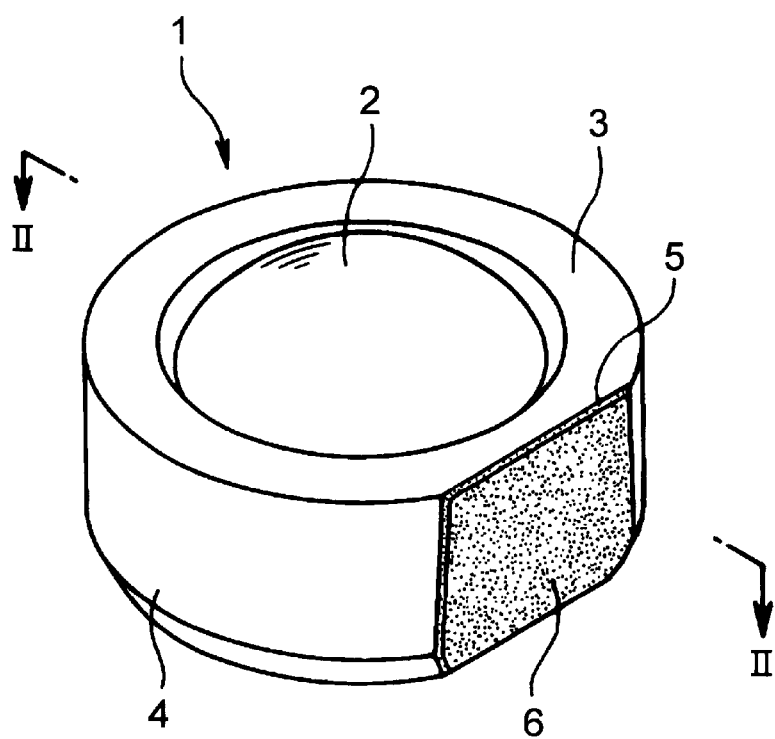
FIG. 1 is a perspective view showing an optical lens in accordance with the present invention.
Figure 2:
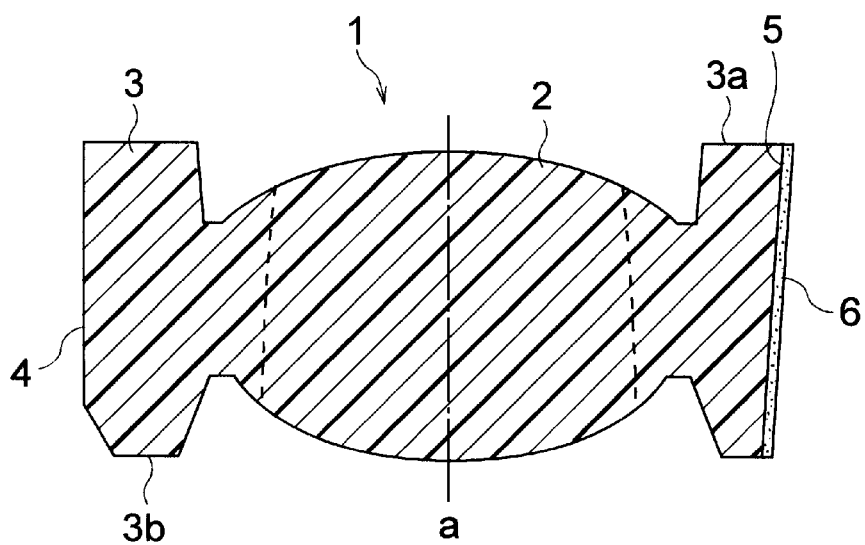
FIG. 2 is a sectional view taken along the line II—II in FIG. 1.

FIG. 1 is a perspective view showing an optical lens in accordance with the present invention. FIG. 2 is a sectional view taken along the line II—II in FIG. 1. The optical lens 1 shown in these drawings is manufactured, for example, by injection molding, transfer molding, or the like using a plastic resin such as PMMA (polymethyl methacrylate), and thus can be made inexpensively. The optical lens 1 has a diameter of about 3 to 8 mm, for example.

Disposed at the center part of the optical lens 1 is an optically functioning part 2 adapted to function as a convex lens, through which light is effectively transmitted. Around the optically functioning part 2, a flange part 3 is formed. As shown in FIGS. 1 and 2, the upper face 3a and lower face 3b of the flange part 3 are made flat. Consequently, the upper face 3a and lower face 3b of the flange part 3 would function as reference surfaces when the optical lens 1 is mounted on a lens holder section (not shown) incorporated in an optical instrument such as 8-mm video camera or CD-ROM drive.

As shown in FIG. 1, the outer circumferential face 4 of the flange part 3 is formed as a cylindrical surface. A part of the outer circumferential face 4 includes a gate-removed part 5 with a flat surface. The gate-removed part 5 is formed at the outer circumferential face 4 by removing the unshown residual gate part that projected from the outer circumferential face 4. The residual gate part 5 is made upon injection molding or the like. Incidentally, the residual gate part indicates the part of resin solidified within the gate orifice and pulled out of the die, or both the gate and the part of resin solidified within the gate, and the residual gate part. Namely, the gate-removed part 5 is defined by flatly cutting a part of the flange part 3 to remove the residual gate part in order that so-called burrs may not project from the outer circumferential face 4 of the optical lens 1. As a consequence, the gate-removed part 5 has a flat surface. Also, the surface of the gate-removed part 5 is located on the lens optical axis (a) side of the original outer circumferential face 4 of the optical lens 1, which is formed as a cylindrical surface (see FIG. 2).

When removing the residual gate part from the outer circumferential face 4 of the optical lens 1 so as to form the gate-removed part 5, an NC processing machine or the like is used for linearly moving a cutting tool such as end mill, thereby flatly cutting a part of the flange part 3 together with the residual gate part. Preferably, in this case, the flange part 3 is cut obliquely as shown in FIG. 2. Here, in the case where the residual gate part is removed by flatly cutting the flange part 3, the tolerance limit on the lens optical axis (a) side, i.e., the distance from the surface of the gate-removed part 5 to the original (ideal) outer circumferential face 4, is generally about 0.3 to 1 mm in an optical lens having an outside diameter of 3 to 8 mm.

The gate-removed part 5 in this optical lens 1 is provided with a hygroscopicity adjusting part 6 in a film form covering the surface of the gate-removed part 5 as a whole. This hygroscopicity adjusting part 6 is made of a material having a hygroscopicity (water-absorbing ratio) lower than that of the plastic resin, such as PMMA, forming the optical lens 1. Any material can be used for forming the hygroscopicity adjusting part 6 as long as it is less hygroscopic than the material forming the optical lens 1. Examples thereof include materials such as UV-curing resins and water glass. Also, the gate-removed part 5 may be coated with a paint containing a material (UV-curing resins, water glass, or the like) less hygroscopic than the material forming the optical lens 1. In either case, any material can be chosen as the material for forming the hygroscopicity adjusting part 6, depending on the lens diameter, lens thickness, and so forth.

For forming the hygroscopicity adjusting part 6 at the gate-removed part 5, a resin or the like may be applied to the gate-removed part 5 of the individual optical lens 1 (for example, by handwork). Preferably, a number of optical lenses 1 are arranged on a jig such that the surfaces of the respective gate-removed parts 5 of the optical lenses 1 are in parallel with each other, and a UV-curable resin, water glass, or the like is applied thereto in this state. As a consequence, working efficiency improves, and the optical lens 1 provided with the hygroscopicity adjusting part 6 at the gate-removed part 5 can be made inexpensively and easily. Preferably, the thickness of the hygroscopicity adjusting part 6 is about 0.01 mm to 0.1 mm.

Thus, in the optical lens 1, since the surface of the gate-removed part 5 is covered with the hygroscopicity adjusting part 6 made of a material less hygroscopic than the plastic used as the material forming the optical lens 1, the amount of moisture absorbed into the optical lens 1 from the gate-removed part 5 by way of the hygroscopicity adjusting part 6 becomes smaller than the amount of moisture absorbed into the optical lens 1 from the outer circumferential face 4 other than the gate-removed part 5. Consequently, the permeation time (speed) of the moisture absorbed into the optical lens 1 from the outer circumferential face 4 and the gate-removed part 5 can be made substantially the same throughout the outer periphery. Namely, even when the distance from the surface of the gate-removed part 5 to the optically functioning part 2 is set short, the moisture absorbed into the optical lens 1 from the gate-removed part 5 by way of the hygroscopicity adjusting part 6 can be prevented from permeating into the optically functioning part 2.

As a result, the density in the optically functioning part 2 can be prevented from changing due to the moisture which is absorbed from the gate-removed part 5 into the optical lens 1 and reaches the optically functioning part 2, whereby the refractive index of the optical lens 1 can be made uniform. Hence, it is possible to realize an optical lens which can be made easily and inexpensively and yields stable optical performances with a uniform refractive index.

Figure 3:
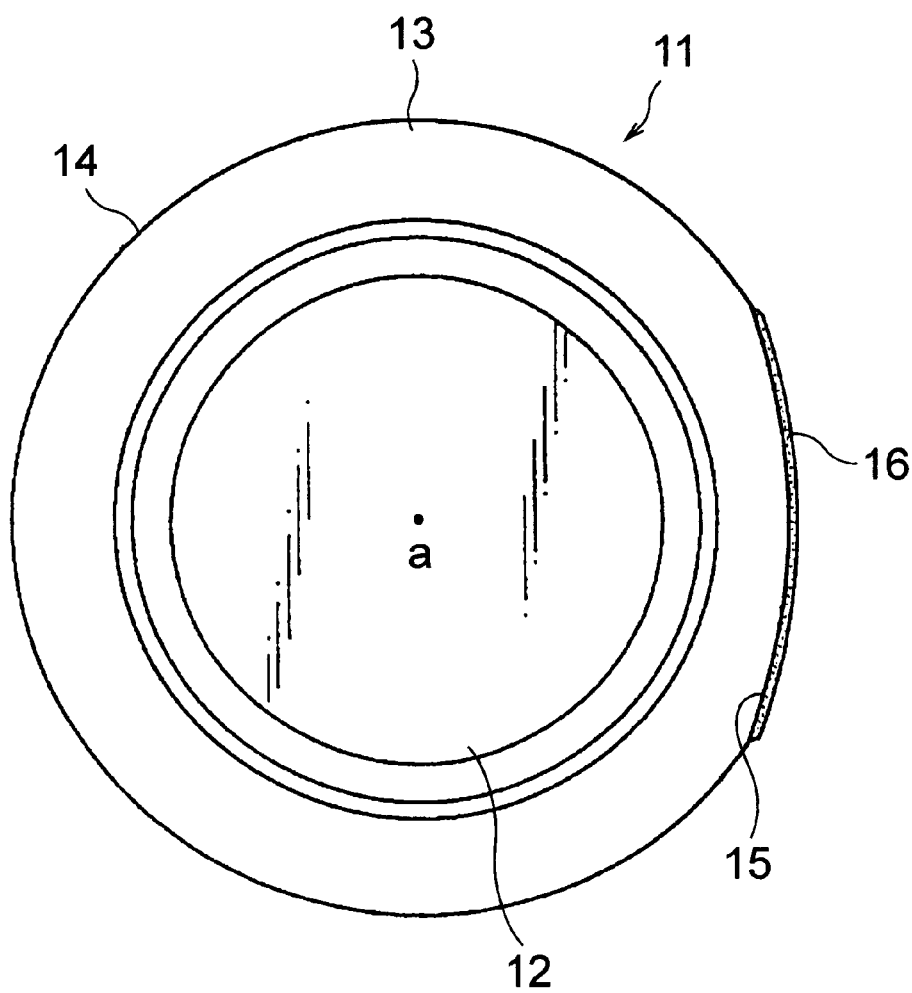
FIG. 3 is a plan view showing another embodiment of the optical lens in accordance with the present invention.
Figure 4:
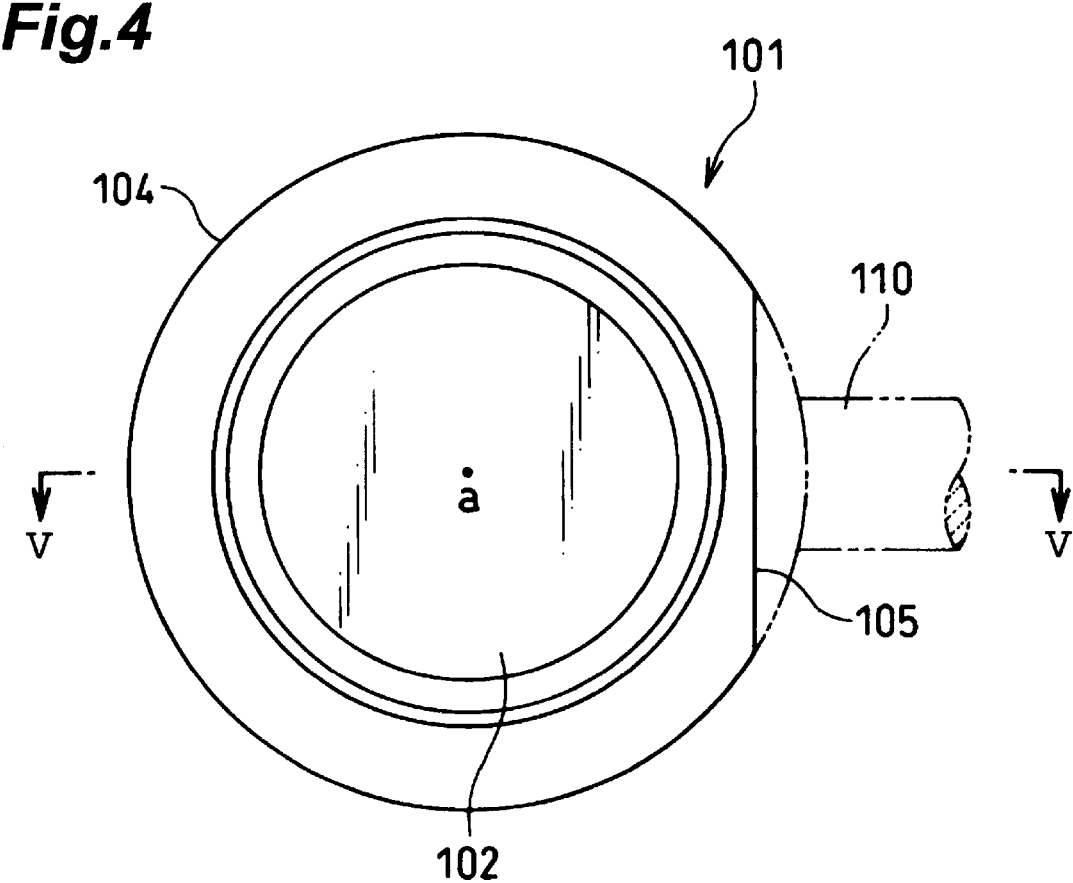
FIG. 4 is a plan view showing a conventional optical lens.
Figure 5:
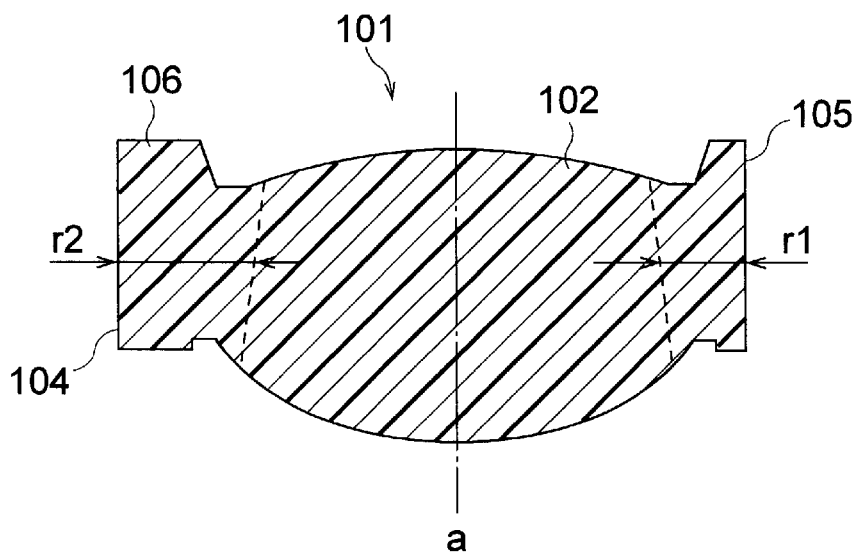
FIG. 5 is a sectional view taken along the line V—V in FIG. 4.

FIG. 3 is a plan view showing another embodiment of the optical lens in accordance with the present invention. Disposed at the center part of the optical lens 11 shown in FIG. 3 is an optically functioning part 12 adapted to function as a convex lens, through which light is effectively transmitted. Around the optically functioning part 12, a flange part 13 is formed. The upper and lower faces of the flange part 13 are made flat, and would function as reference surfaces when the optical lens 11 is mounted on a lens holder section (not shown).

As shown in FIG. 3, the outer circumferential face 14 of the flange part 13 is formed as a cylindrical surface. A part of the outer circumferential face 14 includes a gate-removed part 15 having a substantially quadratic surface (a cylindrical surface in this case, though it may also be an elliptic cylindrical surface, conical surface, or the like). An NC processing machine or the like is used for moving a cutting tool such as end mill along a curve (an arc), so as to cut a part of the flange part 13 together with the residual gate part, thereby forming the gate-removed part 15. The gate-removed part 15 is formed as substantially a quadratic surface projecting outward (toward the side where the residual gate part existed). The surface of the gate-removed part 15 as a whole is covered with a hygroscopicity adjusting part 16 made of an UV-curable resin, water glass, or the like.

When such a configuration is employed, the distance between the surface of the gate-removed part 15 and the lens optical axis (a) can be lengthened. Also, the density in the optically functioning part 12 is more effectively prevented from changing due to the moisture absorbed into the optical lens 11 from the gate-removed part 15, thus allowing the optical lens 11 to have a uniform refractive index.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical lens comprising:

an optically functioning part made of a plastic;

a flange part around said optically functioning part;

a gate-removed part located at an outer circumferential face of said flange part; and a hygroscopicity adjusting part, made of a material less hygroscopic than said plastic, covering a surface of said gate-removed part.

2. The optical lens according to claim 1, wherein said gate-removed part has a flat surface.

3. The optical lens according to claim 1, wherein said gate-removed part has a quadratic surface.

4. The optical lens according to claim 1, wherein said plastic is polymethyl methacrylate resin.

5. The optical lens according to claim 1, wherein said hygroscopicity adjusting part is water glass.

6. The optical lens according to claim 1, wherein said hygroscopicity adjusting part is a UV-curable resin.

\* \* \* \* \*